(12) United States Patent
Bouchard et al.

(10) Patent No.: US 8,778,480 B2
(45) Date of Patent: Jul. 15, 2014

(54) VEHICLE FLOOR MATS

(75) Inventors: Benoît Bouchard, Lachenaie (CA); Arun Kulkarni, Brantford (CA); Mario Primeau, St-Léonard (CA)

(73) Assignee: Koolatron Corporation, Brantford (CA)

( * ) Notice: Subject to any disclaimer, the term of this patent is extended or adjusted under 35 U.S.C. 154(b) by 448 days.

(21) Appl. No.: 13/075,314

(22) Filed: Mar. 30, 2011

(65) Prior Publication Data

US 2012/0251740 A1     Oct. 4, 2012

(51) Int. Cl.
*B32B 3/24*    (2006.01)
*B60B 3/04*    (2006.01)
*B32B 3/26*    (2006.01)

(52) U.S. Cl.
CPC ............... *B60B 3/044* (2013.01); *B60B 3/048* (2013.01); *B32B 3/266* (2013.01)
USPC ............................. 428/131; 428/192; 428/43

(58) Field of Classification Search
CPC ......... B32B 3/266; B60N 3/044; B60N 3/048
USPC ........................................ 428/131, 192, 43
See application file for complete search history.

(56) References Cited

U.S. PATENT DOCUMENTS

| | | | |
|---|---|---|---|
| 3,129,972 A | 4/1964 | Vodra | |
| 4,211,447 A | 7/1980 | DiVincenzo | |
| 4,420,180 A | 12/1983 | Dupont et al. | |
| D325,555 S | 4/1992 | Primeau | |
| D342,932 S | 1/1994 | Primeau | |
| 5,482,759 A | 1/1996 | Primeau | |
| 5,830,560 A | 11/1998 | Koa | |
| 6,794,013 B1 | 9/2004 | Iacovelli et al. | |
| D525,576 S | 7/2006 | Lu | |
| D608,709 S | 1/2010 | Masanek, Jr. et al. | |
| 7,784,848 B2 | 8/2010 | MacNeil | |
| 8,080,302 B2 * | 12/2011 | Gifford et al. | 428/43 |
| 2004/0224130 A1 | 11/2004 | Melucci et al. | |

FOREIGN PATENT DOCUMENTS

WO    2004009401 A1    1/2004

OTHER PUBLICATIONS

Excerpt of website http://www.hvdeveloppement.com/.
Excerpt of website http://www.huskyliners.com/.
Excerpt of website http://www.kraco.com/.
Rubber Queen, Floor Mat & Plastic Accessories Catalog, Wooster Rubber, Ltd./Rubber Queen, Wooster, OH.
WeatherTech, 2011 Product Use Guide, MacNeil Automotive Products Limited, Bolingbrook, IL.

* cited by examiner

*Primary Examiner* — William P Watkins, III
(74) *Attorney, Agent, or Firm* — Bereskin & Parr LLP/S.E.N.C.R.L., s.r.l.

(57) ABSTRACT

A vehicle floor mat includes cutting grooves for severing and removing at least one section of a peripheral portion of the mat. The cutting grooves are arranged to define a plurality of distinct outer contours so that the vehicle floor mat is compatible with a plurality of different vehicle models. The vehicle floor mat can further include apertures arranged to receive the anchors of each of the different vehicle models. Each of the different vehicle models can be selected from different models of a particular vehicle manufacturer. The vehicle floor mat can be compatible with at least five different vehicle models.

20 Claims, 8 Drawing Sheets

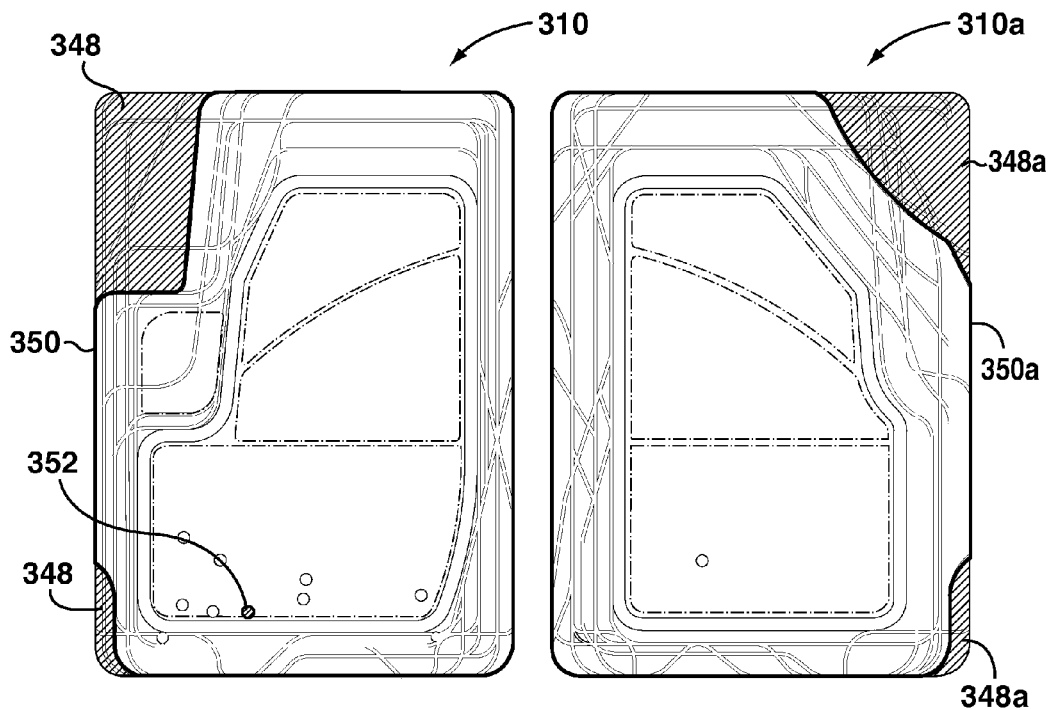
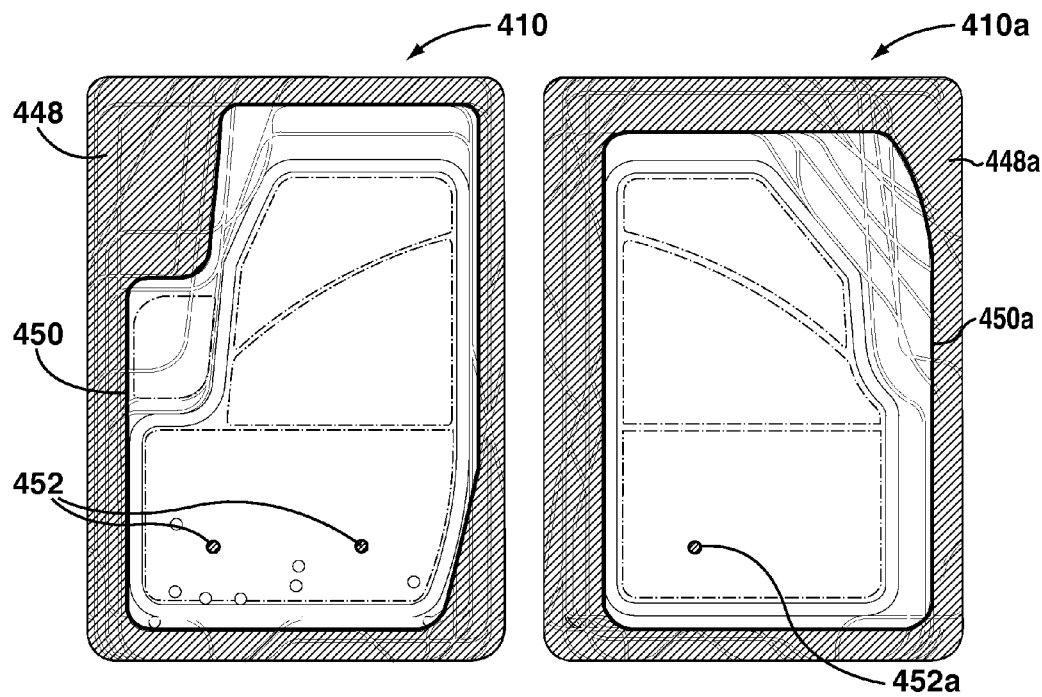

VEHICLE FLOOR MATS

FIELD

This specification relates to vehicle floor mats configured for use with a plurality of different vehicle models.

BACKGROUND

The following background discussion is not an admission that anything discussed below is citable as prior art or common general knowledge.

U.S. Pat. No. 4,420,180 describes a floor mat comprising a main portion for lying flat on an automobile floor and an upwardly inclined portion for lying on an inclined surface within the automobile, such as behind the pedals. The main portion includes a centrally disposed downwardly recessed area forming a pan having a floor and surrounding sides for catching fluid. A plurality of ridges, having a triangular cross-section, rise vertically from the floor of the pan for holding pants and the like above fluids caught in the pan. The forwardly extending portion includes ribs which extend in the longitudinal direction of the mat for channeling fluids backward into the pan. Additional ribs are formed on the forward portion which are inclined downwardly and inwardly for channeling fluid away from the edges of the mat toward the center of the mat.

U.S. Pat. No. 5,482,759 describes an automobile floor mat having a removable and reversible pan portion that snugly fits inside a central recessed area to collect contaminants. One side of the pan is provided with a plurality of diagonal ridges, the space between the ridges forming grooves to collect liquids. The other side of the pan may be constituted of an abrasive surface of the sand paper type.

INTRODUCTION

The following discussion is intended to introduce the reader to the more detailed discussion to follow, and not to limit or define any claim.

Vehicle floor mats are often used to protect the carpeting in a vehicle from damage due to wear, liquid and debris. In the accessory floor mat market, it may be attractive to offer consumers a vehicle floor mat that is compatible for use with a multitude of different vehicle models. However, the foot wells of cars, trucks and SUVs can vary significantly in size and shape from one model of vehicle to the next. Floor mats which at least approximately conform to the shape of the foot well may tend to stay in position better and may provide greater protection and security.

Described herein, a vehicle floor mat includes a plurality of cutting grooves for severing and removing at least one section of a peripheral portion. The cutting grooves are arranged to define a plurality of distinct outer contours so that the vehicle floor mat is compatible with a plurality of different vehicle models. Each of the different vehicle models can be selected from different models of a particular vehicle manufacturer, thereby reducing the burden on the consumer to select the floor mat that will be compatible with his/her vehicle. In various examples, there can be at least five, at least ten, or at least fifteen of the distinct outer contours so that the vehicle floor mat is compatible with a plurality of different vehicle models.

Further, some vehicle models utilize at least one hook or pin fixed to the foot well, referred to herein as an "anchor", and used to secure the floor mat into its position, with the number of anchors and exact location varying depending on the vehicle model. Described herein, the vehicle floor mat can further include a plurality of apertures arranged to receive the anchors of the plurality of different vehicle models.

BRIEF DESCRIPTION OF THE DRAWINGS

FIGS. 7A and 7B show the floor mats of FIGS. 1 and 4, respectively, illustrating a cutting pattern to customize the mats for use with a third vehicle model.

FIGS. 8A and 8B show the floor mats of FIGS. 1 and 4, respectively, illustrating a cutting pattern to customize the mats for use with a fourth vehicle model.

Figure 1:
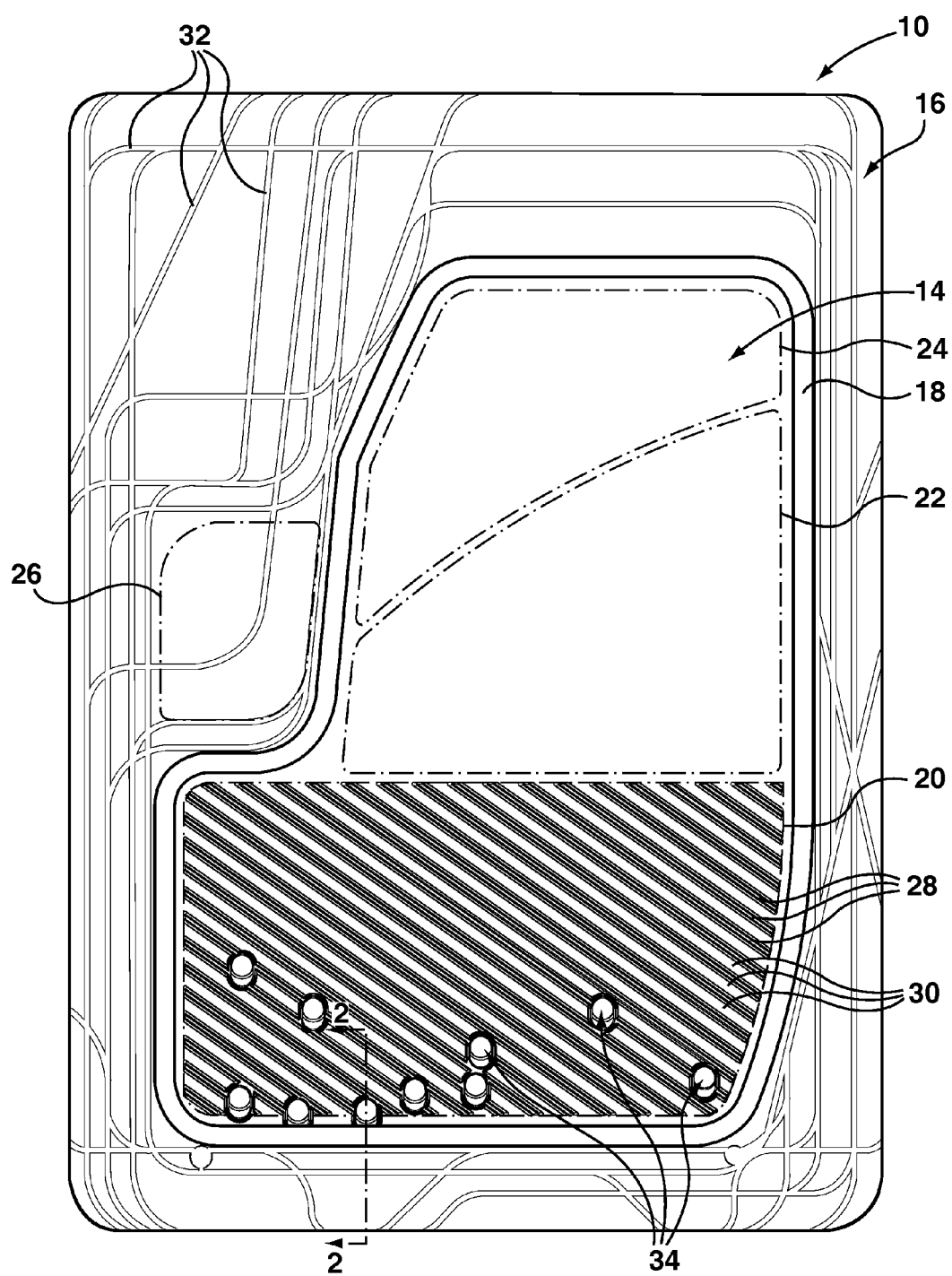
FIG. 1 is a top view of a vehicle floor mat for use on the driver's side of a plurality of different vehicle models.

For simplicity and clarity of illustration, where considered appropriate, reference numerals may be repeated among the drawings to indicate corresponding or analogous elements.

DETAILED DESCRIPTION

Referring to FIG. 1, an example of a vehicle floor mat is shown generally at 10. The vehicle floor mat 10 can be generally planar and unitary in design, and have a durable construction of molded rubber, plastic or other suitable material which is moldable, flexible, and durable. In some examples, the vehicle floor mat 10 can be manufactured by injection molding of recycled PVC material.

The vehicle floor mat 10 comprises a containment portion 14, and a peripheral portion 16 generally surrounding and adjoining the containment portion 14. The containment and peripheral portions 14, 16 can be separated by a border rim 18, which projects upwardly and can confine liquid to the containment portion 14.

As illustrated, the containment portion 14 can comprise a central pan 20, a heel section 22 and a toe section 24. The toe section 24 is typically positioned against an inclined surface of the foot well of the vehicle, near the vehicle pedals. The central pan 20 is usually disposed in a generally horizontal position in front of the seat. The heel section 22 can be positioned in a transition area between the inclined toe section 24 and the generally level central pan 20, so that liquid and debris collected in the heel and toe sections 22, 24 can be collected into the central pan 20 by force of gravity. The sections 22, 24 can be formed of a relatively thick section of material and include various ridges or other traction features to provide a non-slip surface and allow for migration of liquid to the central pan 20.

As illustrated, the peripheral portion 18 can include a secondary heel section 26, which lies adjacent to the heel section 22 on the other side of the border rim 18. The section 26 can be formed of a relatively thick section of material and include various ridges or other traction features to provide a non-slip surface.

The central pan 20 comprises a plurality of upwardly projecting and generally parallel ridges 28. As illustrated, the ridges 28 can run transversely, diagonally across the central pan 20, and define channels 30 between the ridges 28 that are configured to collect liquid therein. In some examples, the ridges 28 can be configured as described in U.S. Pat. Nos. 4,420,180 and 5,482,759, and sold under the brand name PANTS SAVER® (Koolatron Inc. of Brantford, Ontario, Canada). In such examples, it can be possible for the central pan 20 to hold up to 500 ml of liquid or more.

The peripheral portion 16 comprises a plurality of cutting grooves 32. For clarity of illustration, only some of the cutting grooves 32 are labeled with its reference numeral in FIG. 1. The cutting grooves 32 can be used as a guide for severing and removing at least one section of the peripheral portion 16 so that the vehicle floor mat 10 can be trimmed to fit the dimensions of the foot well of a particular vehicle. Specifically, the cutting grooves 32 are arranged to define a plurality of distinct outer contours, as described in further detail below, so that the vehicle floor mat 10 is compatible with a plurality of different vehicle models.

The central pan 20 comprises a plurality of apertures 34 disposed among the ridges 28. As described in further detail below, the apertures 34 are arranged to receive the anchors of different vehicle models so that the vehicle floor mat 10 is compatible and can be secured into position using the anchors of the different vehicle models.

Figure 2:
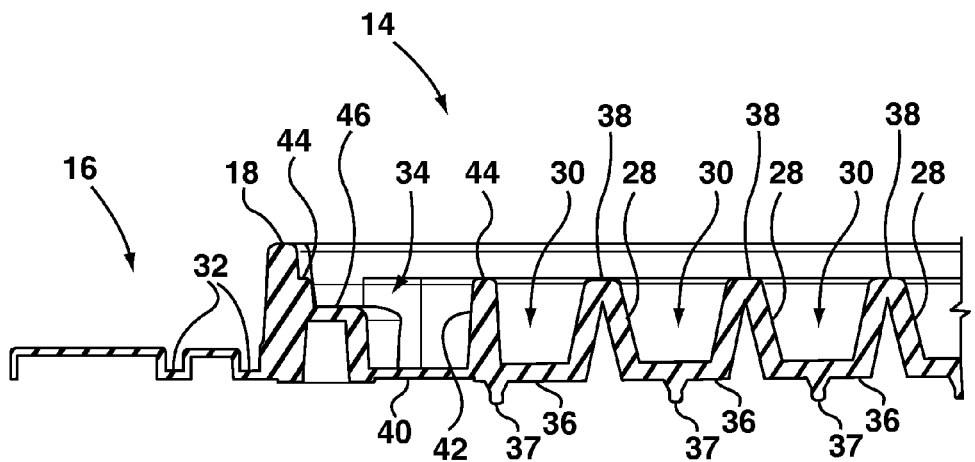
FIG. 2 is a sectional view taken along line 2-2 of FIG. 1.

As illustrated in FIG. 2, the ridges 28 can be generally triangular in cross section, with each projecting upwardly from a pan floor 36 of the central pan 14 to an apex 38 spaced apart from the pan floor 36. The border rim 18 can have a height that is slightly higher than that of the apices 38 of the ridges 28. The pan floor 36 can include nibs 37 on the bottom surface thereof which can be used to help secure the vehicle floor mat into position. The cutting grooves 32, and the entirety of the peripheral portion 16 itself, can have a relatively thin wall thickness (less than a thickness dimension of the pan floor 36), so that it can be relatively easy to trim the peripheral section 16 along the cutting grooves 32 with, for example, scissors or a utility knife.

Each of the apertures 34 can be enclosed by a bottom wall 40 that is generally coextensive with the pan floor 36 of the central pan 14. The bottom wall 40 ensures that, for the apertures 34 that are not used to receive an anchor, the apertures 34 are impermeable and liquid retained in the central pan 20 does not leak through the vehicle floor mat 10. As illustrated, a thickness dimension of the bottom wall 40 can be relatively thin (less than a thickness dimension of the pan floor 36), so that it is relatively easy to cut and remove the bottom wall 40 with, for example, scissors or a utility knife, to utilize one or more of the apertures 34.

Figure 3:
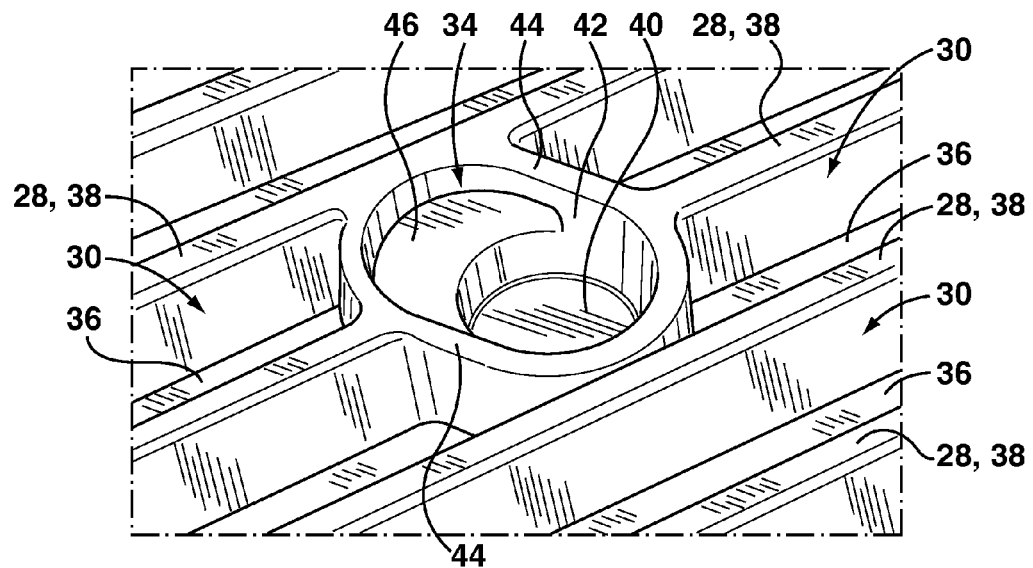
FIG. 3 is a detailed perspective view of an anchor-receiving aperture of the vehicle floor mat of FIG. 1.

Referring to FIGS. 2 and 3, each of the apertures 34 can comprise a circumferential rim 42 that projects upwardly from the bottom wall 40 to segregate liquid collected between the ridges 28 from the aperture 34. A top 44 of the circumferential rim 42 is generally coextensive with the apices 38 of the ridges 28 of the central pan 20. As illustrated, an upper portion of the circumferential rim 42 can be generally oblong in shape, and a step feature 46 disposed intermediate the bottom wall 40 and the top 44 can be provided to securely accommodate anchors that are shaped with a "hook" end.

Figure 4:
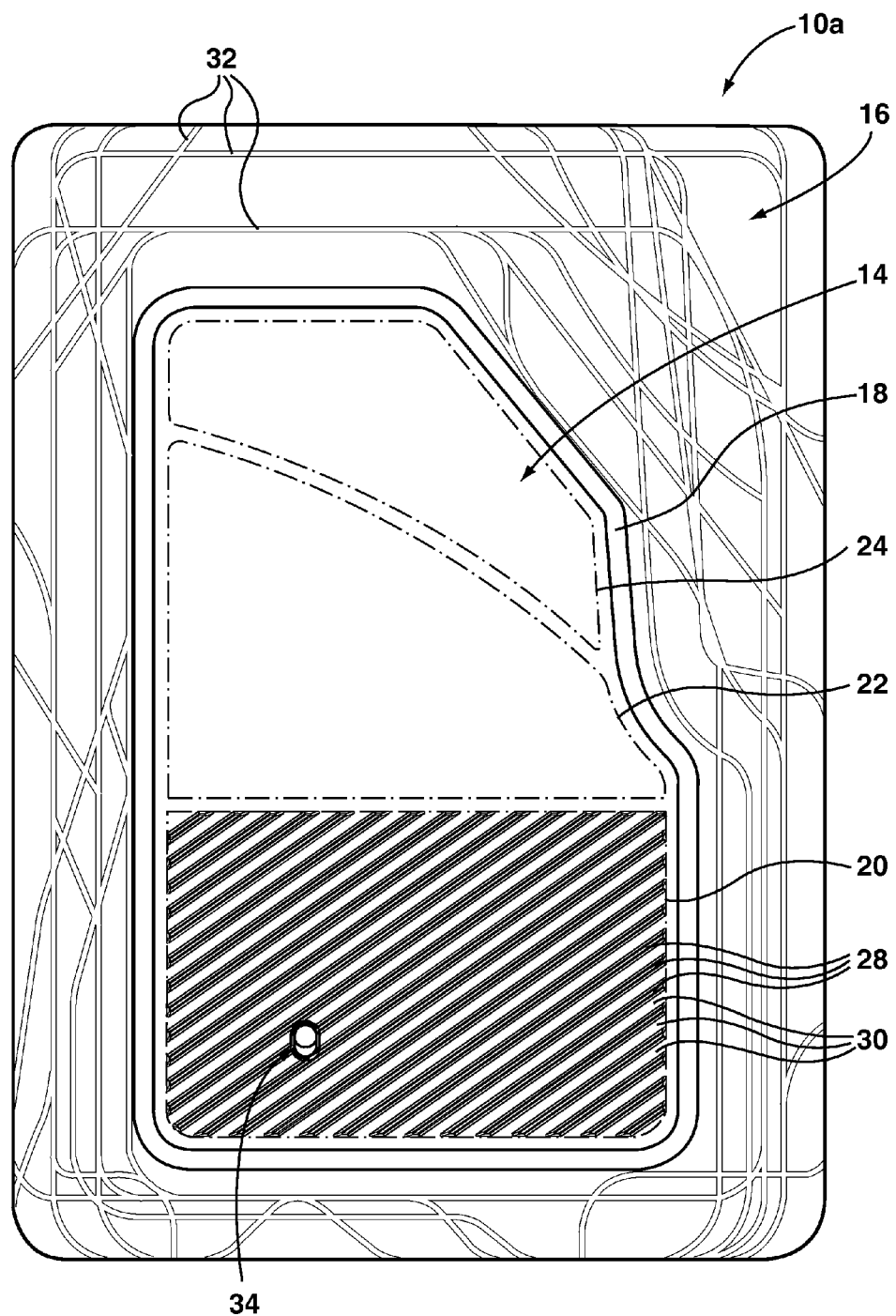
FIG. 4 is a top view of a vehicle floor mat for use on the passenger's side of the different vehicle models.

Referring to FIG. 4, another example of a vehicle floor mat is shown generally at 10*a*. The vehicle floor mat 10*a* is generally similar to the vehicle floor mat 10, the difference being that the vehicle floor mat 10*a* is designed for use on the passenger's side of different vehicle models. Only a single anchor-receiving aperture 34 is illustrated.

Figures 5A, 5B:
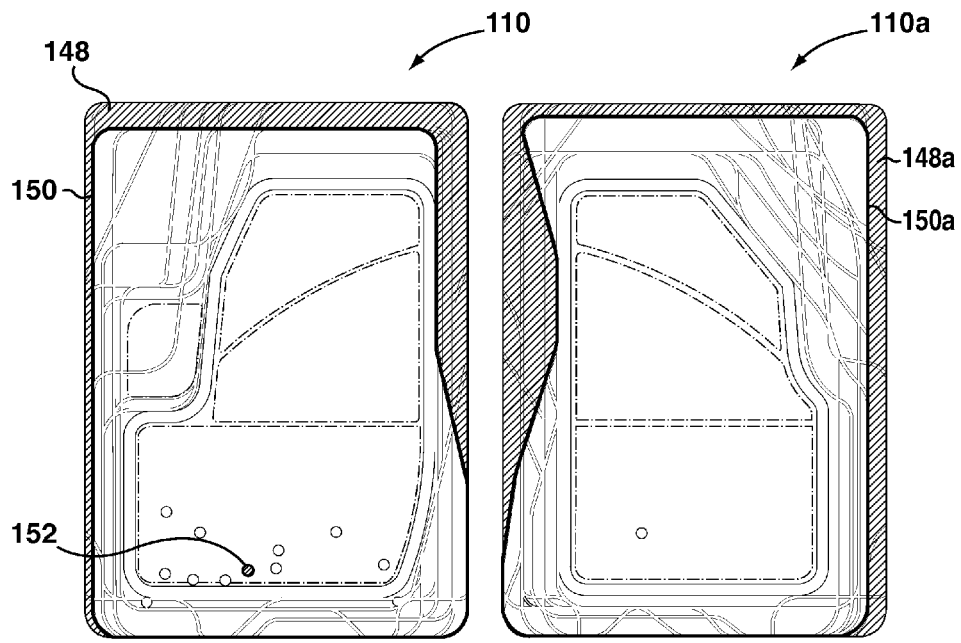
FIGS. 5A and 5B show the floor mats of FIGS. 1 and 4, respectively, illustrating a cutting pattern to customize the mats for use with a first vehicle model.

Referring to FIGS. 5A and 5B, at least one section 148 can be severed and removed from the vehicle floor mat 110 to define a distinct outer contour 150 for the vehicle floor mat 110, so that the vehicle floor mat 110 is shaped for use with a first particular model vehicle. Also, as illustrated, an aperture designated 152 can be cut open to be used for receiving an anchor, the position of which depends on the particular model vehicle. Similarly, at least one section 148*a* can be removed from the vehicle floor mat 110*a* to define a distinct outer contour 150*a* for the vehicle floor mat 110*a*.

Referring back to FIGS. 1 and 4, the vehicle floor mats 10, 10*a* can be designed so that they are compatible with a plurality of different vehicle models of a particular vehicle manufacturer. In the example illustrated, the vehicle floor mats 10, 10*a* as illustrated have been designed for compatibility with a broad range of FORD ™ vehicle models.

Figures 6A, 6B:
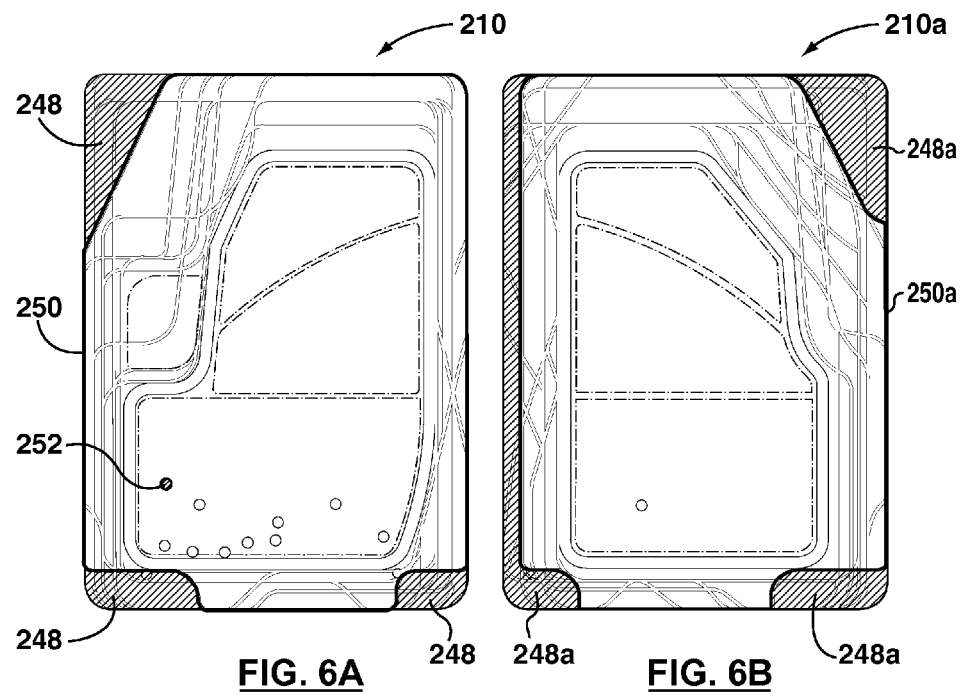
FIGS. 6A and 6B show the floor mats of FIGS. 1 and 4, respectively, illustrating a cutting pattern to customize the mats for use with a second vehicle model.
Figures 9A, 9B:
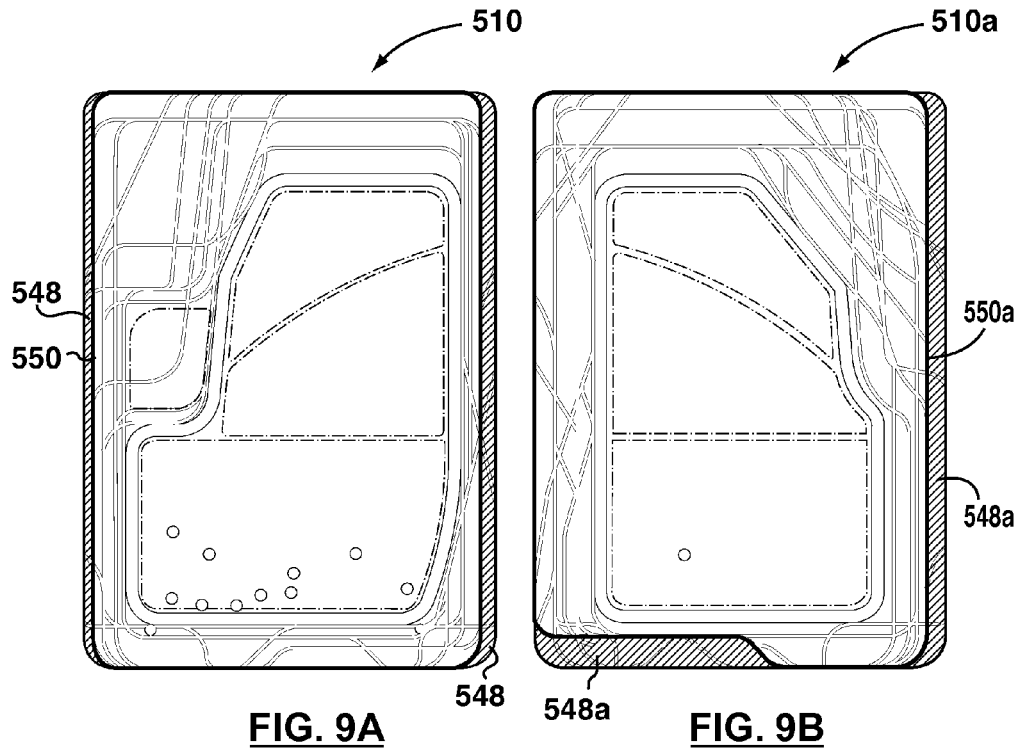
FIGS. 9A and 9B show the floor mats of FIGS. 1 and 4, respectively, illustrating a cutting pattern to customize the mats for use with a fifth vehicle model.
Figures 10A, 10B:
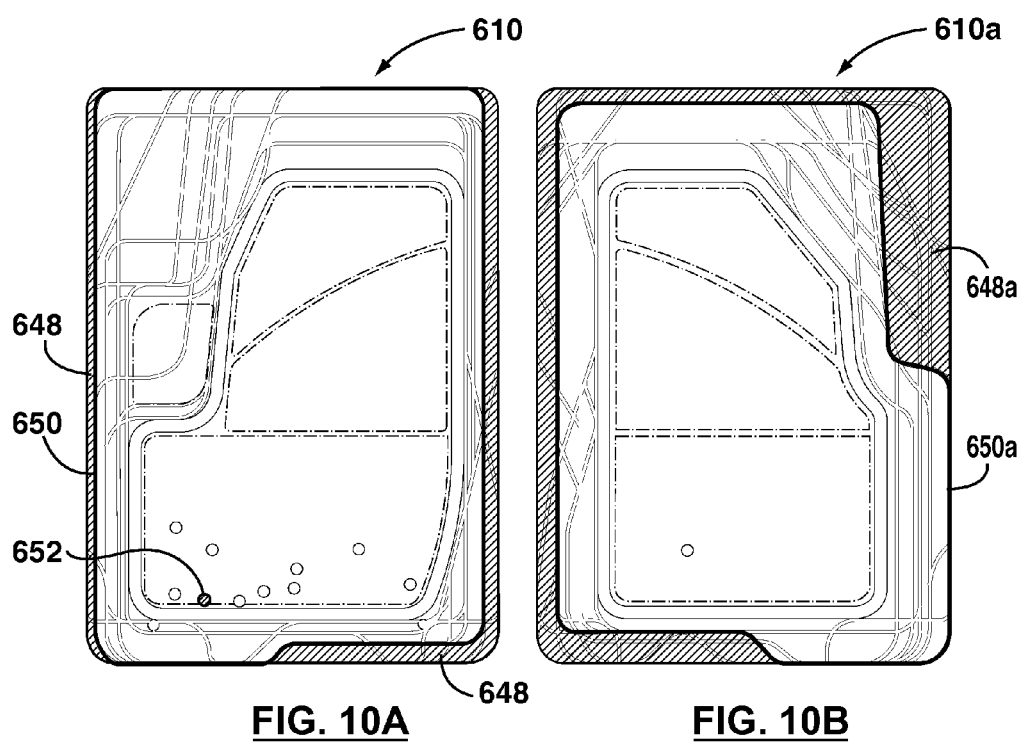
FIGS. 10A and 10B show the floor mats of FIGS. 1 and 4, respectively, illustrating a cutting pattern to customize the mats for use with a sixth vehicle model.
Figure 11A:
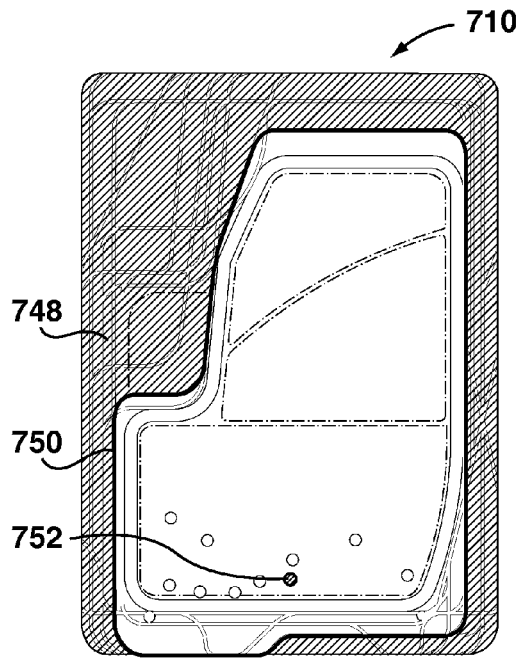
FIGS. 11A and 11B show the floor mats of FIGS. 1 and 4, respectively, illustrating a cutting pattern to customize the mats for use with a seventh vehicle model.
Figure 11B:
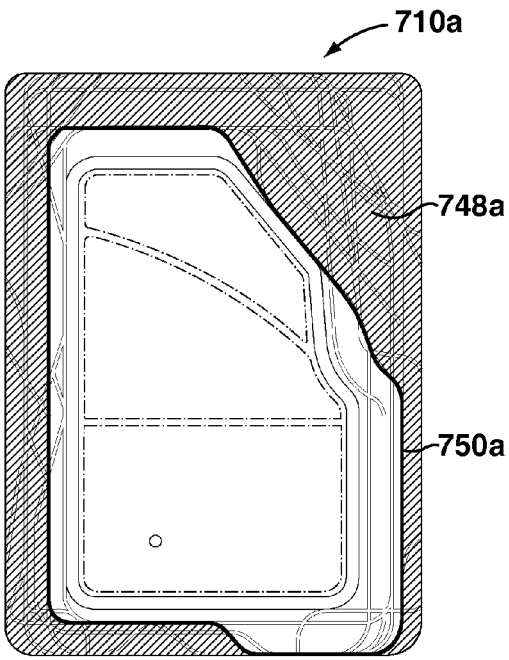
Figure 12A:
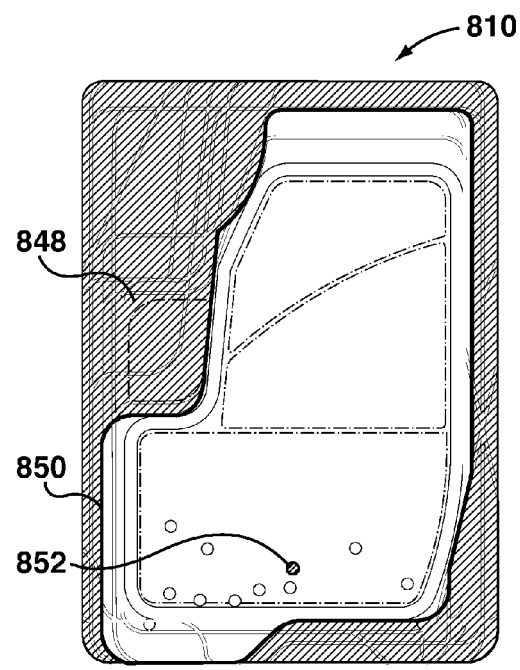
FIGS. 12A and 12B show the floor mats of FIGS. 1 and 4, respectively, illustrating a cutting pattern to customize the mats for use with an eighth vehicle model.
Figure 12B:
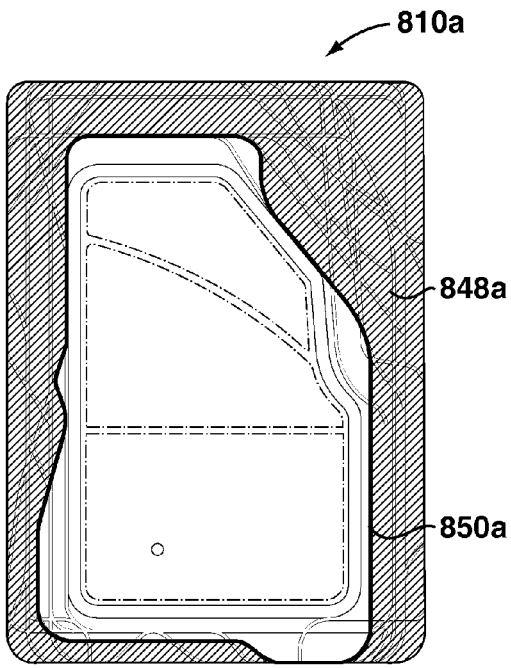
Figures 13A, 13B:
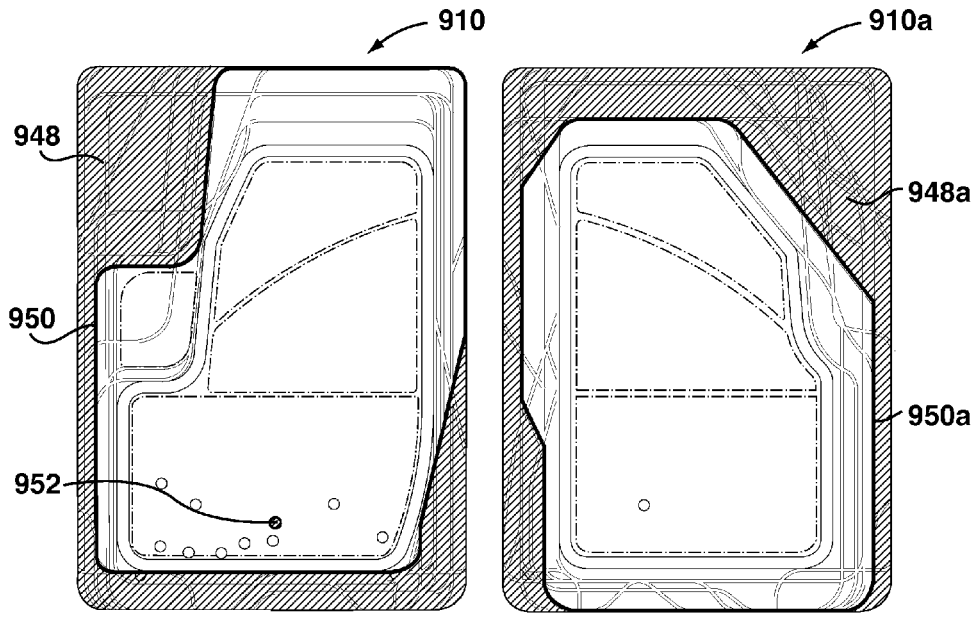
FIGS. 13A and 13B show the floor mats of FIGS. 1 and 4, respectively, illustrating a cutting pattern to customize the mats for use with a ninth vehicle model.
Figures 14A, 14B:
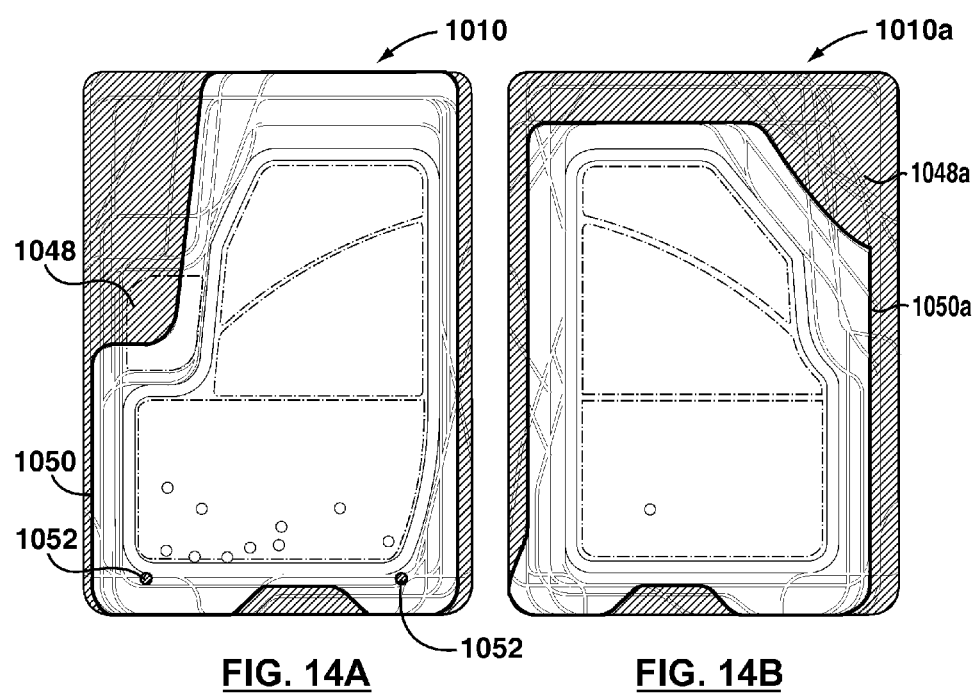
FIGS. 14A and 14B show the floor mats of FIGS. 1 and 4, respectively, illustrating a cutting pattern to customize the mats for use with a tenth vehicle model.

Specifically, in FIGS. 5A and 5B, the vehicle floor mats 110, 110*a* show a cutting pattern to trim them for use with CROWN VICTORIA™ and GRAND MERCURY™ vehicles (1992-2010). In FIGS. 6A and 6B, the vehicle floor mats 210, 210*a* show a cutting pattern to trim them for use with EDGE™ vehicles (2007-). In FIGS. 7A and 7B, the vehicle floor mats 310, 310*a* show a cutting pattern to trim them for use with ESCAPE™ vehicles (2001-). In FIGS. 8A and 8B, the vehicle floor mats 410, 410*a* show a cutting pattern to trim them for use with EXPLORER™ and EXPLORER SPORTSTRAC™ vehicles (2006-). In FIGS. 9A and 9B, the vehicle floor mats 510, 510*a* show a cutting pattern to trim them for use with F-150™, F-250™ and F-350™ vehicles (2004-2008). In FIGS. 10A and 10B, the vehicle floor mats 610, 610*a* show a cutting pattern to trim them for use with F-150™, F-250™ and F-350™ vehicles (2009-). In FIGS. 11A and 11B, the vehicle floor mats 710, 710*a* show a cutting pattern to trim them for use with FIVE HUNDRED™ and FREESTYLE vehicles (2005-2007), and TAURUS™ and TAURUS X™ vehicles (2008-2009). In FIGS. 12A and 12B, the vehicle floor mats 810, 810*a* show a cutting pattern to trim them for use with FLEX™ vehicles (2009-). In FIGS. 13A and 13B, the vehicle floor mats 910, 910*a* show a cutting pattern to trim them for use with FOCUS™ vehicles (2000-2007). In FIGS. 14A and 14B, the vehicle floor mats 1010, 1010*a* show a cutting pattern to trim them for use with FOCUS™ vehicles (2008-).

The distinct outer contours illustrated in FIGS. 5A to 14B are not exhaustive. There are at least 15 distinct outer contours so that the vehicle floor mat 10, 10*a* of FIGS. 1 and 4 are compatible with at least 15 of the different FORD™ vehicle models.

The vehicle floor mats 10, 10*a* can be sold with a cutting pattern guide, which conveys to the consumer (in a similar manner to that of FIGS. 5A to 14B) the cutting grooves (and apertures) to be cut to customize the vehicle floor mat for use with a particular vehicle model. Thus, a method of customizing the vehicle floor mat as described above comprises providing the cutting pattern guide, selecting a particular vehicle model and consulting the cutting pattern guide to identify at least one section of the vehicle floor mat to be removed so that the vehicle floor mat is compatible with the particular vehicle model, and cutting (using, for example, scissors or a utility knife) along the cutting grooves of the vehicle floor mat to remove the at least one section according to the cutting pattern guide. With the cutting pattern guide, a consumer is able to customize the mat for his/her vehicle in the comfort of their home, and without a "trial and error" approach to obtaining a proper fit.

Vehicle floor mats can be designed to be compatible with a plurality of different vehicle models of other manufacturers. For example, vehicle floor mats designed for use with GENERAL MOTORS™, CHRYSLER™, DODGE™, MAZDA™, HYUNDAI™, HONDA™, NISSAN™ and TOYOTA™ vehicles are possible.

To design a vehicle floor mat for use with a plurality of vehicle models of a particular vehicle manufacturer, the first step is to take relatively precise measurements of floor well dimensions for each of the desired models. Next, the dimensions of the models can be superimposed onto one another, for example, using computer-aided design. The positions of the floor dimensions can then be adjusted so that each is generally centered relative to one another (so the position of the central pan can be established in a common position). Finally, a plurality of cutting grooves can be drawn and arranged to approximate the dimensions (for example, to within an accuracy 95% to 100% of the dimensions, and/or to within ½" increments) for each of the plurality of models, the cutting grooves defining the plurality of distinct outer contours. By approximating the dimensions, the cutting grooves can be arranged to overlap to the greatest extent possible, thereby minimizing the total number of cutting grooves, which can minimize confusion during cutting and helps maintain the aesthetic appearance of the mat.

While the above description provides examples of one or more processes or apparatuses, it will be appreciated that other processes or apparatuses may be within the scope of the accompanying claims.

We claim:

1. A vehicle floor mat, comprising:
   a containment portion including a central pan, the central pan including a plurality of upwardly projecting ridges configured to collect liquid therebetween; and
   a peripheral portion adjoining the containment portion, the peripheral portion including a plurality of cutting grooves for severing and removing at least one section of the peripheral portion, the cutting grooves arranged to define a plurality of distinct outer contours so that the vehicle floor mat is compatible with a plurality of different vehicle models,
   wherein the central pan comprises a plurality of apertures arranged to receive anchors of each of the plurality of different vehicle models,
   wherein each of the plurality of apertures is enclosed by a bottom wall that is generally coextensive with a pan floor of the central pan, and
   wherein, for each of the plurality apertures, the bottom wall is selectively removable to receive the anchor of a predetermined one of the plurality of different vehicle models to customize the vehicle floor mat for the predetermined vehicle model, and, for the remaining apertures, the bottom walls ensure that the apertures are generally impermeable and liquid retained in the containment portion does not leak through the vehicle floor mat.

2. The vehicle floor mat of claim 1, wherein each of the different vehicle models are selected from different models of a particular vehicle manufacturer.

3. The vehicle floor mat of claim 2, wherein there are at least five of the distinct outer contours so that the vehicle floor mat is compatible with at least five of the different vehicle models.

4. The vehicle floor mat of claim 1, wherein a thickness dimension of the bottom wall is less than a thickness dimension of the pan floor.

5. The vehicle floor mat of claim 1, wherein each of the apertures comprises a circumferential rim that projects upwardly from the bottom wall to segregate liquid collected between the ridges from the aperture.

6. The vehicle floor mat of claim 5, wherein a top of the circumferential rim is generally coextensive with apices of the ridges of the central pan.

7. The vehicle floor mat of claim 6, wherein the circumferential rim is generally oblong in shape.

8. The vehicle floor mat of claim 7, wherein the circumferential rim comprises a laterally projecting step feature disposed intermediate the bottom wall and the top.

9. In combination, the vehicle floor mat of claim 1 and a cutting pattern guide, the cutting pattern guide illustrating selected ones of the cutting grooves to be cut to customize the vehicle floor mat for use with a particular one of the vehicle models.

10. A vehicle floor mat comprising a plurality of upwardly projecting ridges configured to collect liquid therebetween, and a plurality of apertures disposed among the ridges and arranged to receive the anchors of a plurality of different vehicle models, each of the apertures enclosed by a bottom wall, each of the apertures including a circumferential rim that projects upwardly from the bottom wall to segregate liquid collected between the ridges from the apertures, a top of the circumferential rim generally coextensive with apices of the ridges, wherein, for each of the plurality apertures, the bottom wall is selectively removable to receive the anchor of a predetermined one of the plurality of different vehicle models to customize the vehicle floor mat for the predetermined vehicle model, and, for the remaining apertures, the bottom walls ensure that the apertures are generally impermeable and liquid retained in the ridges does not leak through the vehicle floor mat.

11. The vehicle floor mat of claim 10, wherein the bottom wall is generally coextensive with a pan floor.

12. The vehicle floor mat of claim 11, wherein a thickness dimension of the bottom wall is less than a thickness dimension of the pan floor.

13. The vehicle floor mat of claim 10, wherein the circumferential rim is generally oblong in shape.

14. The vehicle floor mat of claim 13, wherein the circumferential rim comprises a laterally projecting step feature disposed intermediate the bottom wall and the top.

15. A vehicle floor mat, comprising:
   a containment portion comprising a pan floor, a plurality of ridges projecting upwardly from the pan floor, and a plurality of apertures arranged to receive anchors of a plurality of different vehicle models so that the vehicle floor mat is compatible with each of the plurality of different vehicle models, each of the apertures comprising a bottom wall, and a circumferential rim that projects upwardly from the bottom wall to segregate liquid collected between the ridges from the aperture; and a peripheral portion adjoining the containment portion, the peripheral portion comprising a plurality of cutting grooves for severing and removing at least one section of the peripheral portion, the cutting grooves arranged to define a plurality of distinct outer contours, each of the plurality of distinct outer contours corresponding to a respective one of the plurality of different vehicle models, wherein, for each of the plurality of apertures, the bottom wall is selectively removable to receive the anchor of a predetermined one of the plurality of different vehicle models to customize the vehicle floor mat for the predetermined vehicle model, and, for the remaining apertures, the bottom walls ensure that the apertures are generally impermeable and liquid retained in the containment portion does not leak through the vehicle floor mat.

16. The vehicle floor mat of claim 15, wherein a top of the circumferential rim is generally coextensive with apices of the ridges of the central pan.

17. The vehicle floor mat of claim 16, wherein the bottom wall is generally coextensive with the pan floor.

18. The vehicle floor mat of claim 17, wherein a thickness dimension of the bottom wall is less than a thickness dimension of the pan floor.

19. The vehicle floor mat of claim 15, wherein the bottom wall is generally coextensive with the pan floor.

20. The vehicle floor mat of claim 19, wherein a thickness dimension of the bottom wall is less than a thickness dimension of the pan floor.

* * * * *